No. 818,653. PATENTED APR. 24, 1906.
E. BADER.
PISTON ROD PACKING.
APPLICATION FILED MAY 19, 1905.
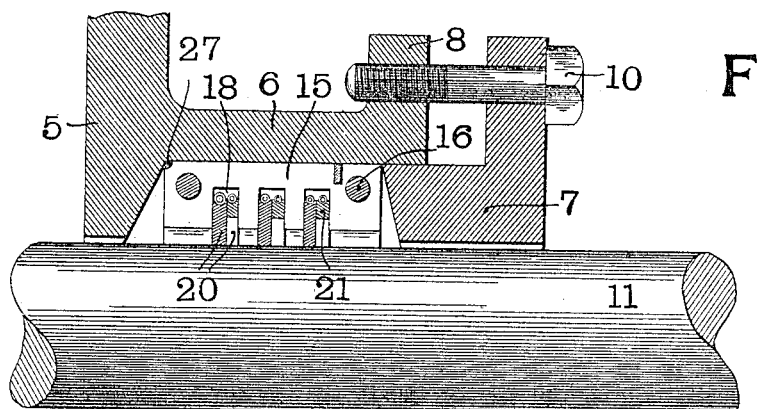
Fig.1.
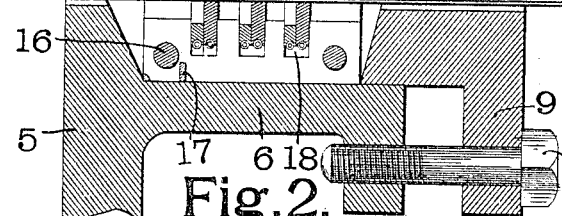
Fig.2.
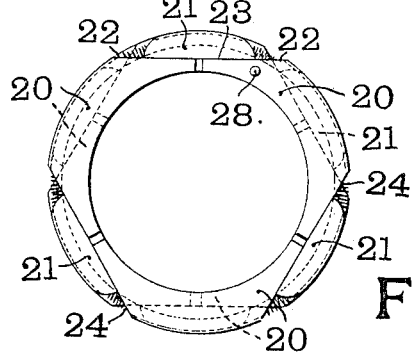
Fig.3.
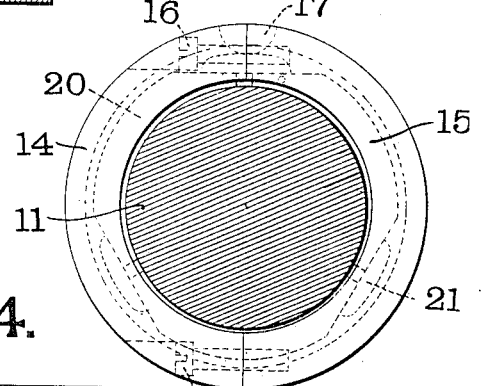
Fig.4.
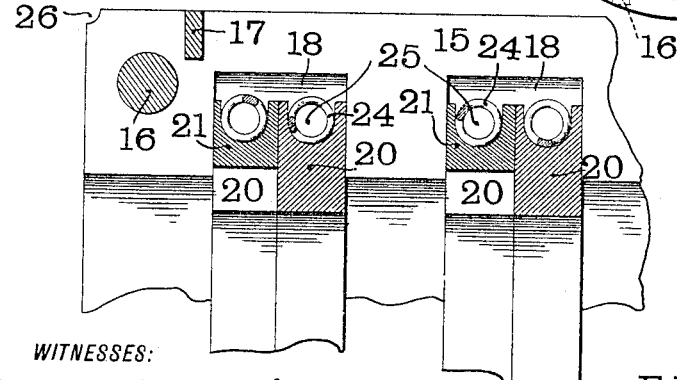
WITNESSES:
W. A. Alexander.
Fred C. Henke.
INVENTOR
Edward Bader.
BY
Fowler & Bryson
ATTORNEYS ic
UNITED STATES PATENT OFFICE.

EDWARD BADER, OF ST. LOUIS, MISSOURI.

PISTON-ROD PACKING.

No. 818,653.  Specification of Letters Patent.  Patented April 24, 1906.

Application filed May 19, 1905. Serial No. 261,153.

*To all whom it may concern:*

Be it known that I, EDWARD BADER, a citizen of the United States, residing at the city of St. Louis, State of Missouri, have invented a certain new and useful Piston-Rod Packing, of which the following is such a full, clear, and exact description as will enable any one skilled in the art to which it appertains to make and use the same, reference being had to the accompanying drawings, forming part of this specification.

My invention relates to a packing for piston-rods or the like, and more particularly to that class of packing known as "metallic" packing.

The object of my invention is to provide a packing which while simple in construction will be efficient and durable in operation.

In the accompanying drawings, which illustrate a packing made in accordance with my invention, together with a portion of the cylinder of an engine, to which the same is applied, Figure 1 is a central longitudinal section through the end of the cylinder. Fig. 2 is an end view showing a number of the expansible packing-rings used in my device. Fig. 3 is an end view of the casing, the piston-rod being shown in section; and Fig. 4 is an enlarged view of a portion of one part of the casing, two pairs of the packing-rings being shown in section.

Like marks of reference refer to similar parts in the several views of the drawings.

5 represents the head of the cylinder of an engine to which my packing is applied.

6 is a stuffing-box which, as shown in Fig. 1, is formed integral with the piston-head 5.

7 is the gland which coöperates with the stuffing-box 6. The stuffing-box 6 is provided with lugs 8 and the glands 7 with lugs 9. The gland is secured in position by means of bolts 10, which pass through plain openings in the lugs 9 and are screwed into threaded openings in the lugs 8.

11 is the piston-rod of the engine.

All the above parts may be of any usual form.

The casing of my packing is formed of two parts 14 and 15, which are similar, except that the part 14 is provided with plain openings and the part 15 with threaded openings, so that the two parts may be secured together by means of bolts or screws 16, preferably four in number, as shown in the drawings. It is essential that there should be no longitudinal movement between the parts 14 and 15 of the casing, and it is not practical to absolutely prevent such movement by means of the screws 16. Consequently I provide the casing with a pair of semicircular splines 17, which are let into the parts 14 and 15 of the casing across the adjoining line of the two parts, one preferably being placed near one end at one side and the other near the other end at the opposite side, as best shown in Fig. 1. Within the casing I provide a number of annular grooves 18, preferably three in number. Each of these grooves 18 is formed partly in the part 15 and partly in the part 14. The purpose of the splines 17, hereinbefore described, is to secure the exact alinement of these grooves 18. In each of the grooves 18 I provide a pair of expansible packing-rings. Each of these rings consists of three separable parts 20 and three connecting-pieces 21. Each of the parts 20 is curved on its inner face, so as to conform to a portion of the piston-rod 11. The three parts 20 when in position should be somewhat separated, as best shown in Fig. 2. Each of the parts 20 is provided adjacent to its end with a flat bearing-surface 22, and each of the connecting-pieces 21 has a flat bearing-surface 23, which bears upon two of the aforesaid bearing-surfaces 22. The parts 20 are held firmly against the piston-rod and the parts 21 against the parts 20 by means of an annular coiled spring 24, which fits in a groove 25, formed in the said parts. The two rings of each pair are placed, as best shown in Fig, 2, so that the joints in one ring will be opposite the solid parts of the adjacent ring, and consequently a perfect steam-tight joint will be formed. One of the rings of each pair is provided with a pin 28, which enters a perforation in the adjacent ring, and the rings are thus prevented from relative rotation. The rings are somewhat smaller in diameter than the grooves 18, as plainly shown in the drawings, so that the rings are capable of movement perpendicular to the axis of the bearing in order to compensate for any inequality in the piston-rod 11. This movement, however, is so slight that there will be scarcely any wear between the rings or between the rings and the casing, and consequently no adjustment is needed to compensate for such wear. The structure of the rings enables the springs 24 to compensate for any wear between the parts 20 and the piston-rod 11. In order to provide a steam-tight joint between the casing and the stuffing-box 6, I provide one end of the casing with a groove 26 and place between such groove and the corner of the stuffing-box a suitable packing 27—such, for instance, as lead wire.

I am aware that it has heretofore been proposed to make a packing in which a number of expansible rings were placed side by side in a casing, each ring being composed of two superimposed rings of separable parts, the two superimposed rings being either concentric or eccentric. The objection to such packing, however, is that the joints between the two superimposed rings must either coincide or must cross each other at two points, or they must cross the adjoining joints of the parts of the ring. Another objection to such construction is that when the inner ring is worn by friction against the piston-rod the joint between the two rings will not coincide. The object of my present invention is to overcome the above objections.

Having fully described my invention, what I claim as new, and desire to secure by Letters Patent of the United States, is—

1. In a packing for piston-rods or the like, the combination with a casing formed of two semicylindrical parts, a plurality of grooves formed in both parts of said casing, a spline set into said casing across the line of junction of the two parts to prevent relative longitudinal movement between said parts, and a pair of expansible rings arranged side by side in each groove, each ring being composed of a plurality of separable parts, the junction of one ring facing the solid parts of the adjacent ring.

2. In a packing for piston-rods or the like, the combination with a casing formed of two semicylindrical parts, of a plurality of grooves formed in both parts of said casing, a pair of splines set into said casing across the line of junction of the two parts at opposite sides and opposite ends to prevent relative longitudinal movement between said parts, and a pair of expansible rings arranged side by side in each groove, each ring being composed of a plurality of separable parts, the junction of one ring facing the solid parts of the adjacent ring.

In testimony whereof I have hereunto set my hand and affixed my seal in the presence of the two subscribing witnesses.

ED. BADER. [L. S.]

Witnesses:
 W. A. ALEXANDER,
 BENNETTE PIKE.